Figure 3:
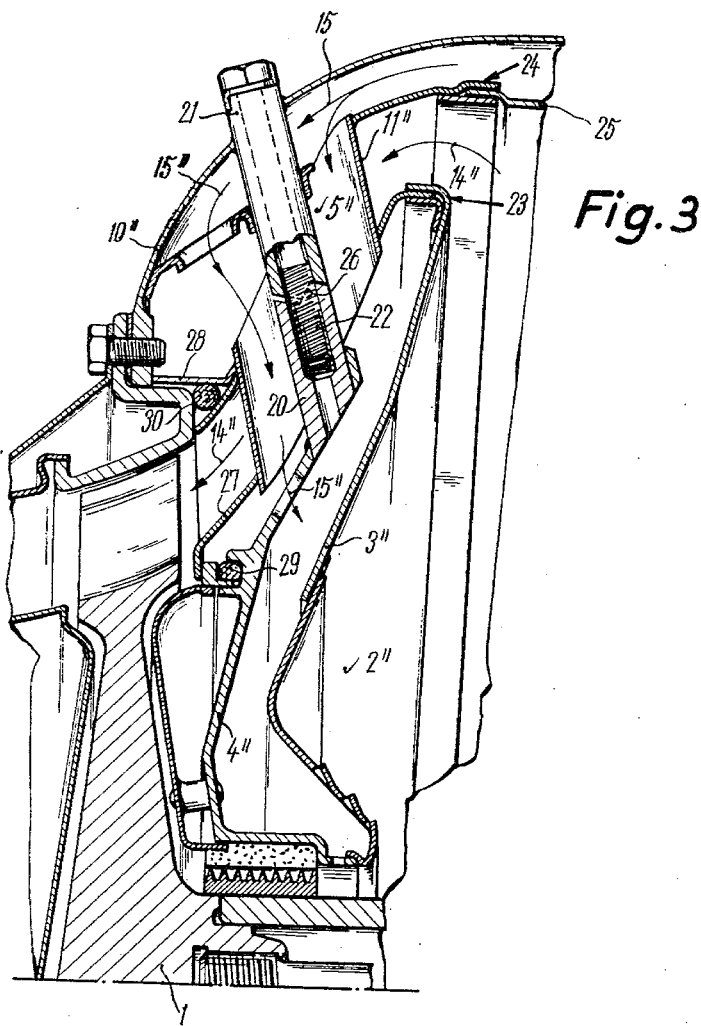

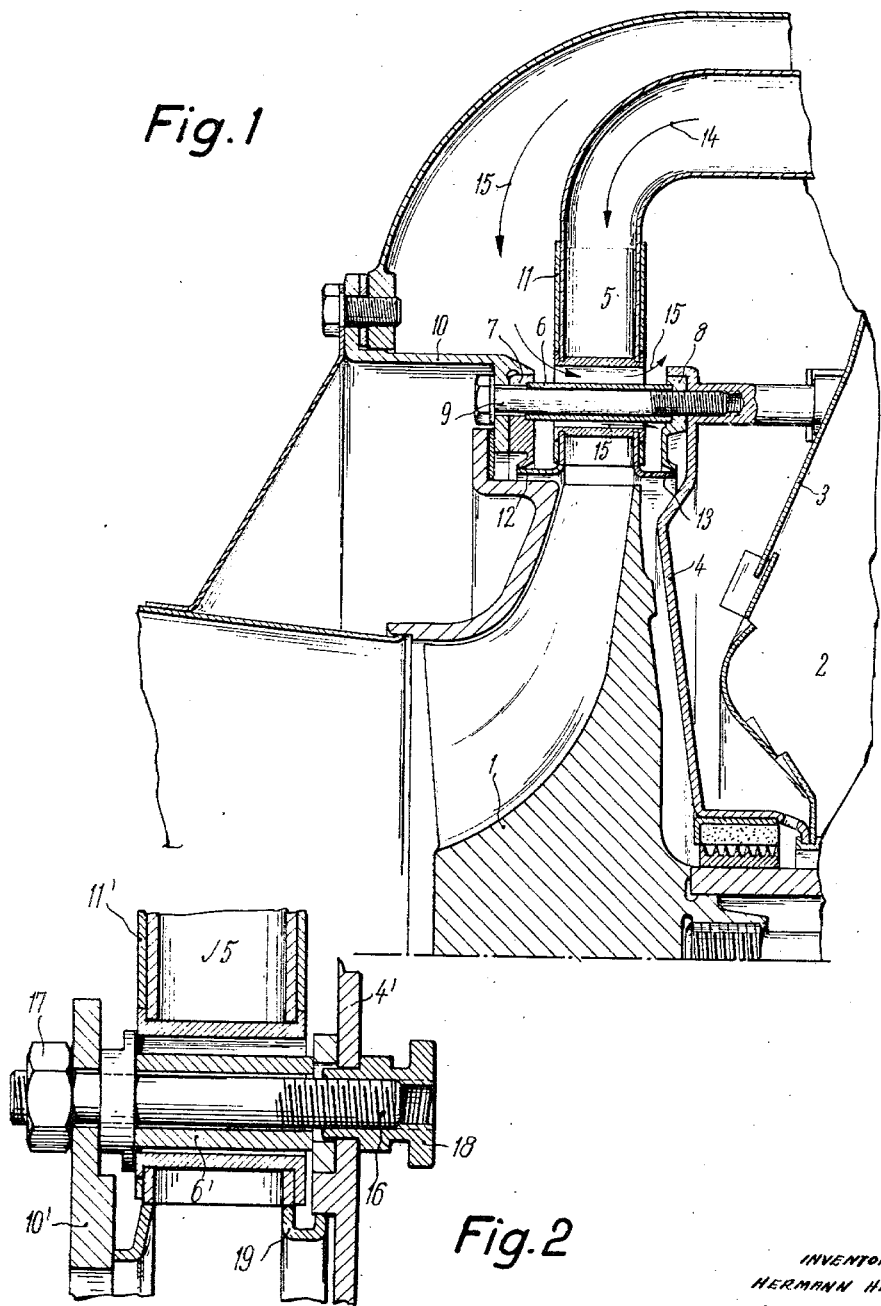

United States Patent Office 3,199,294
Patented Aug. 10, 1965

3,199,294
AIR-COOLED SUPPORT AND GUIDE VANE ASSEMBLY FOR A GAS TURBINE ENGINE
Hermann Hagen, Munich, Germany, assignor to BMW Triebwerkbau Gesellschaft m.b.H., Munich-Allach, Germany
Filed Apr. 23, 1962, Ser. No. 189,604
Claims priority, application Germany, Apr. 25, 1961, B 62,264
8 Claims. (Cl. 60—39.31)

The present invention relates to a gas turbine, particularly to a small gas turbine of the type provided with a combustion chamber arranged between the rotors of a centripetal turbine and a radial compressor, which combustion chamber is traversed by the combustion gases in the radially or diagonally outward direction, and in which supporting disks or the like serve both for receiving sealing elements disposed between turbine rotor and combustion chamber and/or between compressor rotor and combustion chamber, as well as for securing the combustion chamber walls.

In gas turbines of this construction, it has already been proposed in the prior art to carry out the securing of the supporting disk on the turbine side directly at the turbine guide-vane ring, about which flow the hot combustion gases, by means of bolts extendging through the hollow turbine guide vanes, whereby the turbine guide-vane ring itself is rigidly suspended from relatively cool parts of the turbine housing.

It is also known to take the turbine guide-vane ring and the supporting disk in one piece.

Disadvantageous in these prior art securing methods of the turbine guide-vane ring and of the supporting disk provided with sealing elements are the thermal expansions at the hot turbine guide-vane ring, about which flow the combustion gases, which thermal expansions are transferred to the sealing elements, for example, to the labyrinth packings, by reason of the rigid connection of the supporting disk with the turbine guide-vane ring. This results in radial displacements of the supporting disk which cause, for example, the labyrinth to rub against the turbine shaft rotating at a high circumferential speed. This, in turn, results in a strong wear and tear of the labyrinth points and therewith in higher gas losses and in a deterioration of the degree of efficiency of the entire gas turbine. A further disadvantage of such prior art arrangement resides in the fact that the turbine guide-vane ring, which is made of relatively thin sheet metal for reasons of weight, is deformed by the axial clamping action so that the cross section of the guide-vane ring, which contributes to the determination of the amount of gas flow, is changed thereby.

The present invention aims at avoiding these disadvantages and proposes therefor to rigidly secure the supporting disk located on the side of turbine to a relatively cold part of the turbine housing through the hollow turbine guide vanes, whereas the turbine guide-vane ring is secured to this connection or to other structural parts of the turbine in such a manner as to be able to yield under thermal expansion.

Accordingly, it is an object of the present invention to provide a gas turbine construction, particularly small gas turbine construction which avoids the aforementioned shortcomings encountered in the prior art types of connections in an effective manner and by relatively simple and inexpensive means.

It is another object of the present invention to provide a fastening and securing arrangement of the guide vanes and/or of the supporting members carrying the sealing elements in gas turbines which effectively prevents deformations due to thermal expansions and premature wear and tear of the seals.

Still a further object of the present invention resides in the provision of a supporting arrangement of the seals, particularly those used between the combustion chamber and the turbine and/or compressor of gas turbines, which assures constant efficiency for the turbine by effectively preventing wear in the seals and therewith unnecessary gas losses.

Another object of the present invention resides in the provision of a securing arrangement for the supporting disk carrying the seals in gas turbines which is so arranged that any deformation of the turbine guide vanes is prevented even though the securing means for the supporting disks extend through the guide vane ring of the turbine.

Another object of the present invention resides in the arrangement and construction of supporting means for the sealing element and mounting means for the turbine guide vane ring which renders the same immune against the disadvantagous effects caused by thermal expansions.

Figure 4:
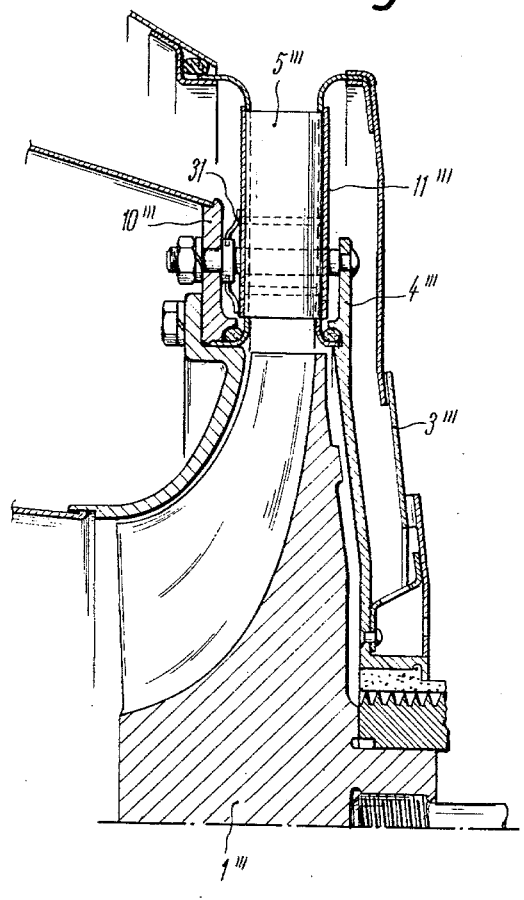

These and other features, objects and advantages of the present invention will become more obvious from the following description when taken in connection with the accompanying drawing, which shows, for purposes of illustration only, several embodiments in accordance with the present invention, and wherein FIGURE 1 is a partial cross sectional view through a first embodiment of gas turbine within the area of the turbine and provided with a securing arrangement of the supporting disk and of the turbine guide vane ring in accordance with the present invention, and FIGURES 2, 3 and 4 are, respectively, partial cross sectional views, similar to FIGURE 1, of these further modified embodiments in accordance with the present invention.

According to the present invention, the compressor air passing through the hollow turbine guide vanes flows about both the securing elements of the supporting disk and also those of the turbine guide-vane ring.

The advantages of the present invention reside substantially in the fact that there is achieved, in a structurally simple manner, without great structural expenditure, and largely by using already available structural parts, a fastening or attachment both of the supporting disk located on the side of the turbine and provided with sealing elements and of the turbine guide-vane ring, which is not influenced by thermal expansions and thus insures a regular performance of the gas turbine, i.e, sealing of the turbine rotor with respect to the combustion chamber.

Referring now to the drawing wherein like reference numerals are used throughout the various views to designate corresponding parts, with the reference numerals being primed, double-primed and triple-primed to designate corresponding parts in FIGURES 2, 3 and 4, respectively, and more particularly to the embodiment of FIGURE 1, a supporting disk designated therein by reference numeral 4 is provided between a turbine rotor 1 and a combustion chamber 2 or a combustion chamber wall 3. This supporting disk 4 serves for receiving or supporting sealing elements, such as, for example, labyrinth packings etc., between turbine rotor 1 and combustion chamber 2 and for securing the combustion chamber wall 3. A similar supporting disk (not shown in the drawing) is provided also on the side of the compressor and serves thereat for sealing the compressor rotor with respect to the combustion chamber and for securing the combustion chamber wall located on the compressor side. The supporting disk 4 is rigidly secured to the stationary cold turbine housing part 10 over spacing means a bushing or sleeve 6, extending through the hollow turbine guide vane 5, and flanges 7 and 8 arranged on both sides of the sleeves 6 by means of a bolt 9, whereas the entire turbine guide-vane ring 11 is connected so as to be yieldable under thermal expansion, for instance, welded to the flanges 7 and 8 through neck portions 12 and 13 capable of thermal expansion. The bolt 9 simultaneously serves for securing the combustion chamber wall 3. The hot combustion gases 14 flow about the turbine guide-vane ring 11 while the virtually cold compressor air 15 passes through the hollow turbine guide vanes 5 and cools the latter as well as the securing elements of the supporting disk 4.

In the embodiment according to FIGURE 2, the gas turbine has essentially the same construction as in the embodiment shown in FIGURE 1, except that the manner of fastening or securing of the turbine guide-vane ring 11' and of the supporting disk 4' is different from the embodiment shown in FIGURE 1. The supporting disk 4' is again rigidly secured to the stationary relatively cold turbine housing part 10' through the hollow turbine guide vane 5' over a bushing or sleeve 6' by means of threaded bolts 16 and nuts 17 and 18, whereas the turbine guide-vane ring 11' is centered in the axial direction at the supporting disk 4' by means of a collar 19 capable of thermal expansion but is not clampingly secured thereby. The bushing or sleeve 6' is slightly longer than the width of the turbine guide-vane ring 11' so that the latter is secured in position with small axial play.

The embodiment of FIGURE 3 shows also a partial cross section through a gas turbine having essentially the same construction as in the preceding embodiments. In the embodiment of FIGURE 3, however, the combustion chamber 2" is arranged to extend diagonally, i.e., obliquely outwardly. The turbine guide-vane ring 11" is also arranged inclined obliquely. Threaded bushings or sleeves 20 are arranged at, for example welded to, the supporting disk 4", which are operatively connected with spacing means comprising threaded bushings or sleeves 21 secured to the outer stationary relatively cold turbine housing part 10" and which extend through the hollow turbine guide-vanes 5", whereby the threaded bushings or sleeves 20 and 21 are connected with each other by a bolt 22 and therewith the supporting disk 4" is rigidly secured to the cold turbine housing part 10". In this embodiment, the turbine guide-vane ring 11" is secured at the combustion chamber walls 3" and 25 over sliding connections 23 and 24 capable of thermal expansion. On the other hand, the turbine guide-vane ring 11" is rigidly connected with the supporting disk 4" or with another stationary part of the housing via parts 27 and 28 by the interposition of packings 29 and 30. The threaded bushings or sleeves 20 and 21 are constructed in a step-like manner for the purpose of centering at the end surfaces 26 thereof operatively connected with each other.

The hot combustion gases 14" again flow about the turbine guide-vane ring 11" outwardly thereof, whereas the securing elements of the supporting disk 4" are cooled by the compressor air 15" passing through the hollow turbine guide vanes 5".

Furthermore, as is evident from FIGURE 4, the turbine guide-vane ring 11''' may be pressed against one of the centering sides by an elastic structural element 31 in order to thereby prevent a to-and-fro swinging movement of the turbine guide-vane ring 11''' during operation of the gas turbine. In this embodiment, the turbine guide-vane ring 11''' is pressed against the supporting disk 4''' by the elastic structural element 31.

While I have shown and described several embodiments in accordance with the present invention, it is understood that the same is not limited thereto, but is susceptible of many changes and modifications within the spirit and scope thereof as known to a person skilled in the art, and I therefore do not wish to be limited to the details shown and described herein, but intend to cover all such changes and modifications as are encompassed by the scope of the appended claims.

I claim:

1. A gas turbine, particularly a small gas turbine, comprising centripetal turbine means including a rotor having a shaft, combustion chamber means disposed laterally of said turbine rotor, seal means disposed between said combustion chamber means and said turbine rotor, hollow turbine guide vane means for directing hot combustion gases from said combustion chamber means to said rotor, passage means extending transversely of said hollow turbine guide vane means and adapted to be traversed by a flow of cooling air, relatively cool turbine housing means, supporting means for said seal means, connecting means rigidly connecting said supporting means to said housing means and extending freely through said passage means in said hollow turbine guide vane means, spacing means provided on said connecting means, said spacing means having a length greater than the width of said guide vane means, said spacing means determining the relative positions of said supporting means and said housing, and further connecting means capable of yielding under thermal expansion connecting and positioning said turbine guide vane means relative to one of the two parts consisting of said first-mentioned connecting means and another structural part of the gas turbine in such a manner as to be capable of expanding under heat.

2. A gas turbine according to claim 1, wherein said cooling air flows about both of said connecting means and said supporting means to cool the same.

3. A gas turbine according to claim 1, wherein said first-mentioned connecting means includes bushing means extending through said passage means, threaded bolt means and nut means for rigidly connecting said supporting means and said housing means, said second-mentioned connecting means comprising thermally expansible collar means yieldingly centering said guide vane means in the axial direction at said supporting means.

4. A gas turbine according to claim 1, wherein said first-mentioned connecting means includes bushing means at said supporting means, second bushing means at said housing means, one of said first and second bushing means extending through said hollow turbine guide vane means, and threaded interconnecting means operatively connecting with each other, said respective first and second bushing means, said first and second bushing means being constructed in a step-shaped manner with respective mutually facing end surfaces.

5. A gas turbine according to claim 1, wherein said further connecting means capable of yielding under thermal expansion includes springy means urging said turbine guide vane means against said supporting means in such a manner as to be capable of expanding under heat.

6. A gas turbine according to claim 1, wherein said spacing means includes hollow bushing means extending through said passage means, flange means at both ends of said bushing means, said first-named connecting means comprising bolt means engaging said flange means for rigidly securing said supporting means at said housing means.

7. A gas turbine according to claim 6, wherein said bolt means serves simultaneously for securing said supporting means and said combustion chamber means.

8. A gas turbine according to claim 7, wherein said further connecting means includes thermally expansible neck portions connecting said turbine guide vane means with said flange means.

References Cited by the Examiner

UNITED STATES PATENTS

| | | | |
|---|---|---|---|
| 2,244,467 | 6/41 | Lysholm | 60—39.32 |
| 2,622,843 | 12/52 | Williams | 253—39 |
| 2,625,013 | 1/53 | Howard | 60—39.32 |
| 2,807,433 | 9/57 | Halford | 253—39.1 |
| 2,856,755 | 10/58 | Szydlowski | 60—39.66 |
| 2,895,295 | 7/59 | Carlson | 60—39.16 |
| 2,950,084 | 8/60 | Perry | 253—39.1 |
| 3,014,694 | 12/61 | Paul | 60—39.66 |
| 3,088,279 | 5/63 | Diedrich | 60—39.66 |
| 3,115,011 | 12/63 | Deinhardt | 60—39.74 |

SAMUEL LEVINE, *Primary Examiner.*

ABRAM BLUM, *Examiner.*